United States Patent
Turcotte et al.

(10) Patent No.: US 6,181,684 B1
(45) Date of Patent: Jan. 30, 2001

(54) AIR INTERFACE STATISTICAL MULTIPLEXING IN COMMUNICATION SYSTEMS

(75) Inventors: Randy Lee Turcotte, Tempe; Rodrigo Ibanez-Meier, Chandler; Kenneth Maynard Peterson, Phoenix, all of AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/017,157

(22) Filed: Feb. 2, 1998

(51) Int. Cl.[7] .................................................. H04J 3/22
(52) U.S. Cl. ..................... 370/332; 370/232; 370/235; 370/252; 370/465
(58) Field of Search ...................... 370/232, 310, 370/311, 312, 318, 330, 337, 352, 400, 465, 478, 235, 252, 237, 315, 329, 332, 401, 402, 422, 468

(56) References Cited

U.S. PATENT DOCUMENTS

| | | | |
|---|---|---|---|
| 4,730,305 | * 3/1988 | Acampora et al. | 370/422 |
| 5,293,382 | 3/1994 | Carson et al. | 370/123 |
| 5,533,009 | * 7/1996 | Chen | 370/232 |
| 5,602,836 | 2/1997 | Papadopoulos et al. | 370/280 |
| 5,648,958 | 7/1997 | Counterman | 370/458 |
| 5,768,254 | * 6/1998 | Papadopoulos et al. | 370/337 |
| 5,991,292 | * 11/1999 | Focsaneanu et al. | 370/352 |
| 6,005,856 | * 12/1999 | Jensen et al. | 370/468 |
| 6,018,528 | * 1/2000 | Gitlin et al. | 370/468 |

* cited by examiner

*Primary Examiner*—Douglas W. Olms
*Assistant Examiner*—Shick Hom
(74) *Attorney, Agent, or Firm*—Jennifer B. Wuamett; Frank J. Bogacz

(57) ABSTRACT

Methods (600, 700), an access controller (350), and a communication system (300) for optimizing utilization of a wireless communication link in a limited bandwidth communication system or network are provided. Statistical multiplexing is achieved by partitioning a wireless communication link (240) into multiple communication channels (250) and assigning communication sources (220) to communicate information over an air interface for a predetermined time interval, where the number of communication sources (220) assigned to the communication channels (250) during a particular time interval exceeds the number of available communication channels (250). The methods (600, 700), access controller (350), and communication system (300) disclosed also allow a system operator to provide varying levels of quality of service (QoS) guarantees in a communication system or network using statistical multiplexing by designating varying levels of QoS among the communication channels (250).

14 Claims, 5 Drawing Sheets

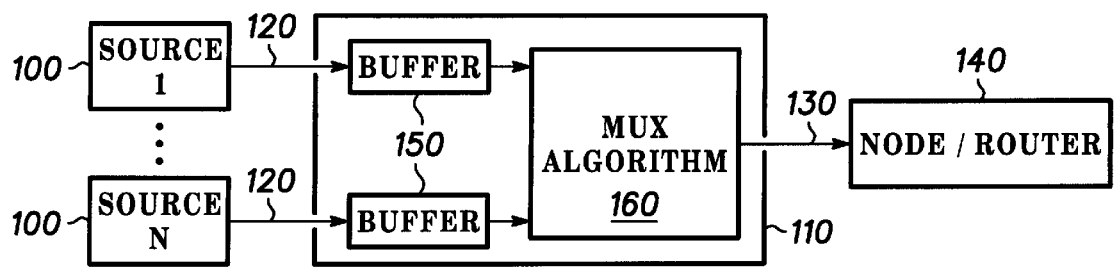
*- PRIOR ART -* *FIG. 1*
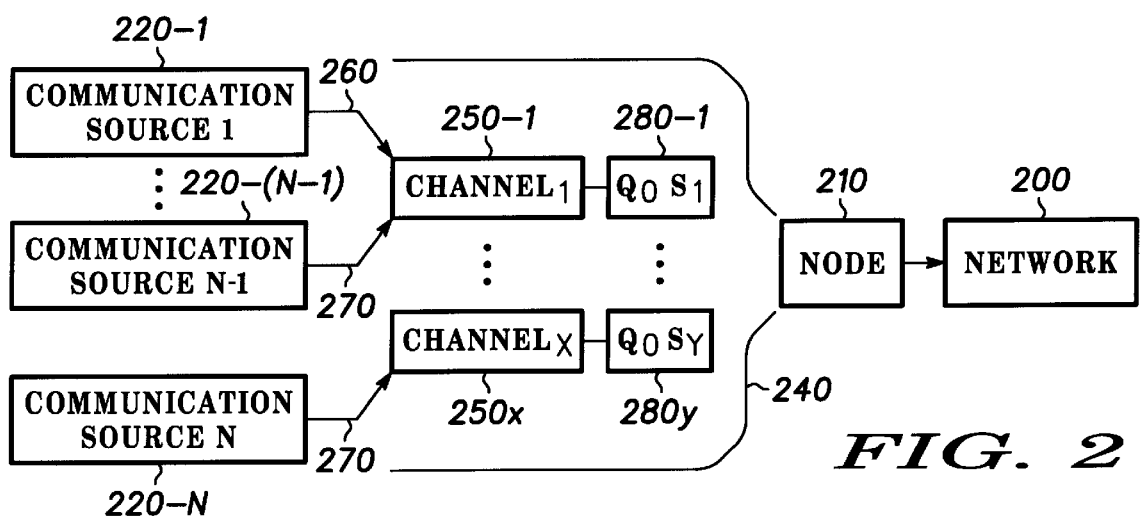
*FIG. 2*
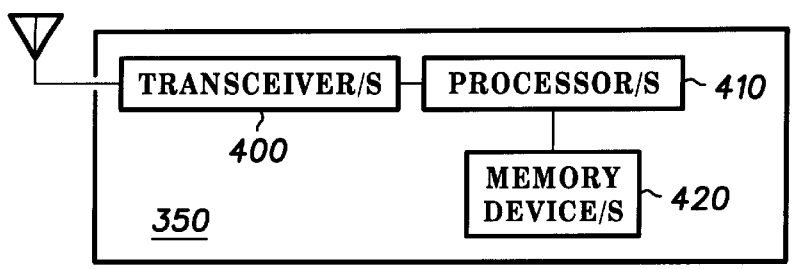
*FIG. 4*

AIR INTERFACE STATISTICAL MULTIPLEXING IN COMMUNICATION SYSTEMS

FIELD OF THE INVENTION

This invention relates generally to the field of multiple access techniques for communication systems. More specifically, this invention relates to a method and apparatus for statistical multiplexing for a wireless communication system.

BACKGROUND OF THE INVENTION

Conventional multiplexing techniques, such as for example, TDM (time-division multiplexing) make inefficient use of bandwidth in communication networks for certain applications (such as "bursty" input streams) because assigned time or frequency slots often go unused. Statistical multiplexing can be used to overcome these inefficiencies.

In statistical multiplexing, a communication link is multiplexed between channels on a probabilistic basis. With a large number of bursty connections, all of the connections may be assigned to the same link with a high probability that they will not all burst information at the same time. If they do burst simultaneously, the burst can be placed in a physical buffer until a free time slot becomes available. Statistical multiplexing allows the sum of the peak bandwidth requirement of all connections to a link to exceed the aggregate available bandwidth of the link under certain conditions. Statistical multiplexing schemes generally provide for smaller average delays on a per-packet basis than TDM or FDM (frequency-division multiplexing). Statistical multiplexing is a distinguishing feature of ATM (asynchronous transfer mode) networks. Through the use of statistical multiplexing, significantly more users can be serviced than without statistical multiplexing, thereby increasing profits of the system or network operator.

Classic wire-based communication networks have long taken advantage of statistical multiplexing to increase network capacity in terms of the number of system users who are able to access the system simultaneously. FIG. 1 illustrates a prior art statistical multiplexer in a classic application. Several communication sources 100, 1-n in the example in FIG. 1, are connected to multiplexer 110 by separate lines or wires 120. Each line 120 has a capacity $C_i$, where $C_i$ is greater than or equal to the full capacity of the source 100 it connects to multiplexer 110. The transmission capability of outgoing line 130 from multiplexer 110 has a capacity $C_{out} < C_T$ where $C_T$ is equal to the sum of all incoming transmission lines. If each source 100 transmits information or data continuously to another network node, such as network node 140, much of the information from one or more of the sources will be lost because the outgoing capacity is less than the total incoming capacity. However, if each or at least most, of sources 100 are statistical in nature, that is arrival of information from the source is bursty in nature, the statistical multiplexer will be able route nearly all of the incoming information to outgoing transmission line 130.

As information arrives randomly from each of sources 100, it is placed in a buffer 150. Processor 160 executes one or more multiplexing ("MUX") algorithms. Multiplexer 110 has one buffer 150 for each of input lines 120. Multiplexer 110 monitors the status of each buffer 150, transferring data from the buffer with the greatest occupancy to outgoing transmission line 130 for transmission to node 140. As a first buffer empties, a next buffer is switched to transfer data to outgoing line 130. In this manner the statistical multiplexer allows outgoing transmission line 130 to have less capacity than the sum of the capacity of all incoming transmission lines 120. This can represent a significant gain in efficiency for a communication system.

To date, the benefits of statistical multiplexing discussed above with respect to wire-based networks have not been fully realized in wireless networks taking advantage of the wireless interface. Multiplexing is generally done by establishing one-to-one links between the nodes of the system and combining individual sources in a multiplexer at the receiver end of the node.

What is needed is a method and apparatus to provide efficiency gain in wireless communication systems similar to that achievable through statistical multiplexing in wire-based communication systems. What is further needed is a method and apparatus to allow for improved efficiency gain in a communication system where system users (sources) are geographically distributed. What is further needed is a method and apparatus to allow for varying levels of quality of service (QoS) in a communication system which employs statistical multiplexing.

BRIEF DESCRIPTION OF THE DRAWINGS

The invention is pointed out below with particularity in the appended claims. However, other features of the invention will become more apparent and the invention will be best understood by referring to the following detailed description in conjunction with the accompanying drawings in which:

FIG. 1 illustrates a prior art statistical multiplexer;

FIG. 2 illustrates a conceptual diagram of a multiplexed wireless communication link of a portion of a communication system or network in accordance with a preferred embodiment of the present invention;

FIG. 4 illustrates a block diagram of an access controller in accordance with a preferred embodiment of the present invention;

Figure 3:
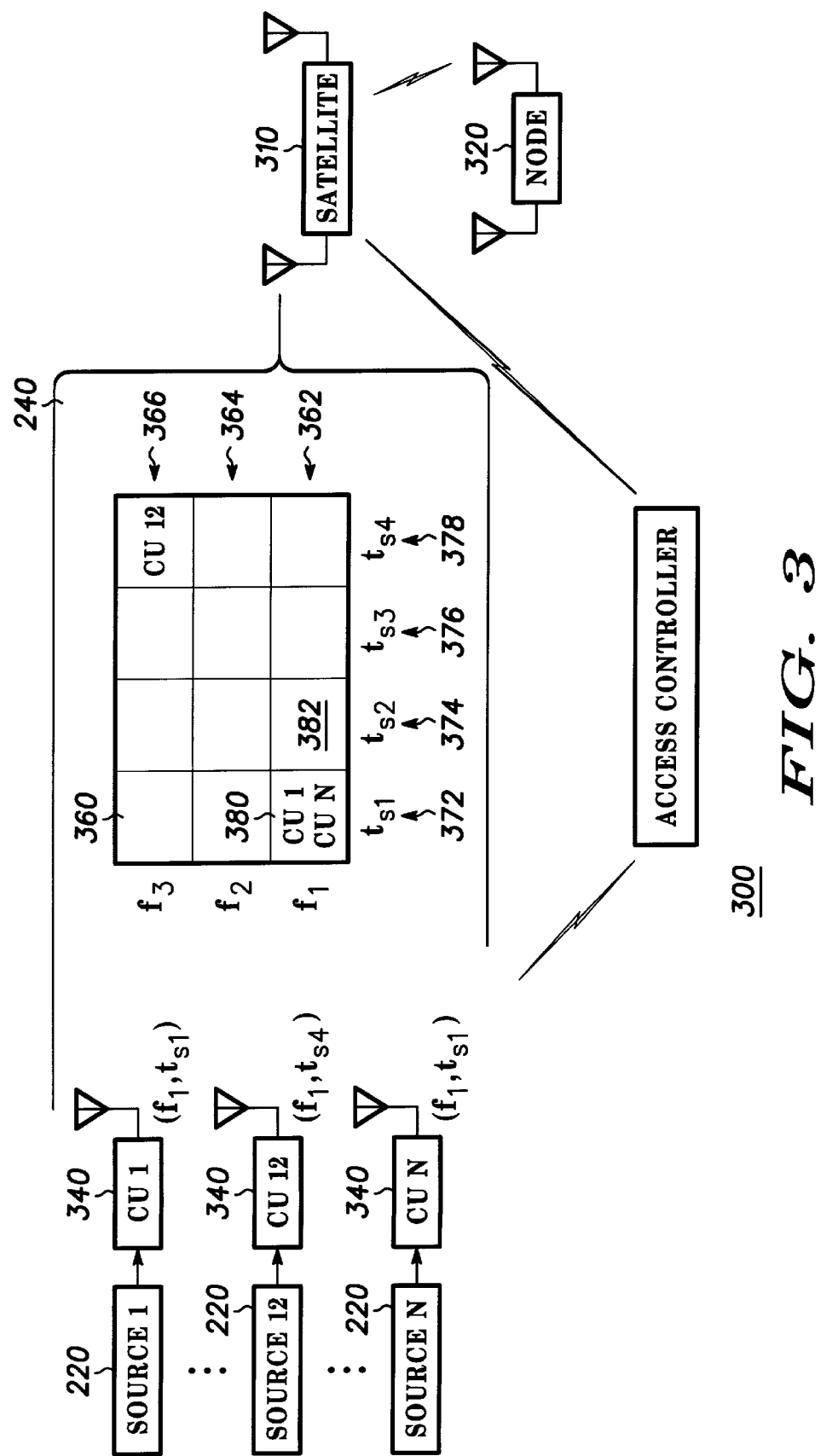
FIG. 3 illustrates a diagram of the components of a satellite communication system in accordance with a preferred embodiment of the present invention.

The exemplification set out herein illustrates a preferred embodiment of the invention in one form thereof, and such exemplification is not intended to be construed to be limiting in any manner.

DETAILED DESCRIPTION OF THE DRAWINGS

The present invention provides, among other things, a novel method and apparatus for optimizing utilization of a wireless communication link in a limited bandwidth communication system or network. The method and apparatus enable both wireless and wire-based communication systems or networks employing traditional multiple access techniques to enjoy the advantages of statistical multiplexing by employing statistical multiplexing over the air interface between nodes of the network, thereby increasing the profitability of the system or network. A more specific advantage of the present invention is that it enables TDMA/FDMA systems, and similar multiple access systems, having widely distributed geographic users to enjoy the benefits of statistical multiplexing. The invention also provides a method and apparatus which allows a system or network operator to provide varying levels of QoS guarantees in a communication system or network using statistical multiplexing. Another advantage of the present invention is that it exploits available channel orthogonality for any chosen multiple access method. That is, it may be used, for example, with FDMA, TDMA, Frequency Hopping CDMA, Direct Sequence CDMA or any combination thereof.

These advantages are achieved by a statistical multiplexing method and apparatus which accomplishes the goals of statistical multiplexing without a physical statistical multiplexing device. Unlike prior art systems, in which multiplexing is achieved by establishing one-to-one links between each node of the network (e.g., communication sources and another node) and then combining traffic from individual sources through a multiplexer at the receiver end, the method and apparatus of the present invention enable statistical multiplexing over the air interface between nodes through a novel access assignment scheme. This is accomplished by "overbooking" wireless communication links in the system through channel sharing assignments. More specifically, a wireless communication link, such as a radio frequency (RF) link is partitioned into multiple channels (as defined below), and more communication sources (or sources of information or data) are assigned to utilize the system than there are channels to allocate to each individual communication source. In a preferred embodiment, the assignment method also factors in QoS concerns by designating a level of QoS for each communication channel. Communication sources then can be assigned to communicate over a particular communication channel based on the desired level of QoS guarantee requested by the communication source.

The method and apparatus of the present invention can be used in a terrestrial or satellite-based communication system or a combination of terrestrial and satellite-based systems. Additionally, the communication system of the present invention can use radio frequency (RF), optical, and/or hard-wired links which support multiple access communication schemes such as TDMA, FDMA, CDMA, and/or combinations thereof.

FIG. 2 illustrates a conceptual diagram of a multiplexed wireless communication link of a portion of a communication system or network in accordance with a preferred embodiment of the present invention. Network 200 desirably is comprised of multiple interconnected nodes, one or more of which could be connected to one or more other networks, the Internet, or the public switched telephone network (PSTN). Network 200 could be a wireless or wire-based network. Node 210 of network 200 establishes a wireless connection link with a number of communication sources 220-i, where i=1, . . . N, which desire to transmit data or information (e.g., digital data representing speech, video, text, etc.) to some other point in network 200 or through the PSTN. Communication sources 220 can be any one of numerous devices capable of transmitting and/or receiving information over network 200, such as, for example, mobile or stationary telephones, radios, computers or similar devices adapted to communicate information, either directly or indirectly, through an air interface over a wireless link, such as wireless communication link 240.

For purposes of the present application, wireless link 240 is defined as a communication path between two nodes of network 200, where a node can be any component of network 200, including a communication source a satellite, a base station, a control facility, or any similar system component. Link 240 can be an RF link, an optical link, or other wireless link and could be used to transmit or receive any type of signals (RF or otherwise) through network 200. In a preferred embodiment of the present invention, link 240 is partitioned into multiple communication channels 250$j$, where j=1–X.

A channel 250 is defined as a portion of wireless communication link 240 through which one or more communication sources 220 can be assigned to transmit or receive information from time to time. More generally, a channel is a path connecting a transmitter to a receiver. Where link 240 is an RF link, channels 250 can consist of the atmosphere or empty space. In a preferred embodiment of the present invention, a digital format is used to communicate information or data over channels 250, and channels 250 support real-time communications. A channel as used herein is intended to include any communication assignment to a communication source 220 communicating information through link 240, including, but not limited to, for example a time slot in a TDMA system, a frequency slot in a FDMA system, a time-frequency (TF) pair assignment in a TDMA/FDMA system, code in a CDMA system, or various other types of assignments for an opportunity to communicate information over link 240.

Referring back to FIG. 1, in prior art systems, each communication source 100 generally is connected to a physical, multiplexer 110 capable of handling the full capacity of any one source. Multiplexer 110 combines the transmissions from a number "N" of multiple communication sources 100 and transmits them over a single outgoing line 130 having a capacity is less than the sum total of the "N" communication sources 100.

In a preferred embodiment of the present invention, unlike prior art systems, statistical multiplexing is carried out over the air interface between two nodes of the network. No physical multiplexer, such as multiplexer 110, is located between communication sources 220 and node 210. As illustrated in FIG. 2, multiple communication sources 220 gain access to network 200 through node 210 over wireless communication link 240. Wireless communication link 240 is partitioned into some finite number of channels, represented in FIG. 2 as X channels 250 (the value of X, or the actual number of channels is a function of bandwidth allocation, data rates, framing structure, and/or other factors).

When the number of communication sources 220 is less than or equal to the number of available channels 250 (i.e., the value of N is less than or equal to the value of X), all of communication sources 220-1-N can use network 200 simultaneously, because each communication source can be assigned a unique channel through which to transmit or receive information or data. When the number of communication sources 220 is greater than the number of available channels, however, (i.e., the value of N is greater than the value of X), not all of communication sources 220-1-N can use network 200 simultaneously in prior art systems, as such systems assign no more than one communication source per channel. Such an arrangement is not efficient, however, in systems where system users or communication sources transmit data irregularly (e.g., through bursty transmissions) because such an arrangement wastes significant system capacity.

In a preferred embodiment of the present invention, statistical multiplexing is applied over an air interface between one or more communication sources 220 and another node 210 to optimize utilization of wireless communication link 240 and make more efficient use of system capacity. This is accomplished by assigning more than one communication source 220 to a single channel 250 thereby requiring one or more communication sources to share a channel assignment. This is illustrated in FIG. 2, where arrows 260 and 270 represent channel assignments of both communication sources 220-1 and 220-(N-1) to one channel 250. This "over-assignment" of communication sources to channels can be referred to as "overbooking" of channels (i.e., assigning multiple communication sources to share a communication channel when communicating through wireless communication link 240).

Overbooking communication channels could cause data transmissions from communication sources assigned to share a channel to randomly collide. However, statistically, the number of collisions of transmissions from shared channels is dominated by the users burst intensity, which on average is less than the capacity allocated. The number of active communication sessions among the N communication sources accessing network 200 through link 240 (and node 210), is generally of the order of N*I, where "I", the mean traffic intensity (I<<1), is the mean product of the arrival rate of their bursts and their duration. Because the value of "I" is less than one for bursty applications, the effective number of communication sources needing service at any given time is less than N and is of the order N*I. Thus, although there is some probability of collisions occurring as a result of channel overbooking, the probability of such collisions occurring in any time interval during which more than one communication source is assigned to a particular channel is minimal. The method of assignment of channels in accordance with a preferred embodiment of the present invention is discussed in more detail below with respect to FIGS. 6–7.

In a preferred embodiment of the present invention, multiple levels of quality of service can be offered to communication sources thereby allowing communication sources to request a specific level of quality of service based on the communication sources need for guaranteed availability, or immediacy of transmission or reception of data or information through network 200. This is accomplished, in part by designating levels of QoS (quality of service) 280-i, where i=1 . . . , y, to communication channels 250. QoS levels 280 can be designated individually among each channel 250 of the total number X of communication channels 250, or QoS levels could be designated by grouping channels into QoS sets, as discussed in more detail with respect to FIG. 5.

FIG. 3 illustrates a diagram of some components of a satellite communication system in accordance with a preferred embodiment of the present invention. Although the method and apparatus of the present invention can be implemented in any communication system transmitting or receiving signals over an air interface at some point in the system, the method and apparatus of the present invention as described above will, for illustrative purposes, now be described in more detail with respect to a satellite communication system. The satellite described below could be analogous to a base station or other intermediary node in system 300 or other systems. "Intermediary node" is used herein to mean any device which provides an interface between one or more communication source, such as CU 340, and the remainder of the system or network.

A "satellite" is defined herein to mean a man-made object or vehicle intended to orbit the earth and includes both geostationary and orbiting satellites and/or combinations thereof, including low earth orbiting (LEO) satellites and other nongeostationary orbit satellites. A "constellation" is defined herein to mean an ensemble of satellites arranged in orbits for providing specified coverage (e.g., radio communication, photogrammetry, etc.) of portion(s) or all of earth.

System 300 includes at least one satellite 310. For clarity, FIG. 3 illustrates only one satellite 310 and a second node 320, which could be another satellite or a base station. In a preferred embodiment, system 300 includes a constellation of LEO satellites which communicate over inter-satellite links such as cross-link 330 as well as multiple other nodes 320 which could include base stations and/or various other devices capable of receiving or transmitting information through system 300. Cross-links 330 are not a necessary of the present invention, however. In an alternative embodiment, a communication could be routed down to or up from any one of many earth terminals through a bent pipe configuration (not shown).

System 300 also includes multiple communication sources 220, which transmit and receive data or information through communication devices such as communication units (CUs) 340. FIG. 3 illustrates only a few of CUs 340 for ease of illustration. However, any number of CUs 340 could be used in system 300. In alternate embodiments, system 300 could be networked together with one or more terrestrial networks and/or one or more bent pipe satellite networks and/or other similar systems.

In general, satellites 310, CUs 340, and other nodes 320 of communication system 300 could be viewed as a network of nodes. Each node of communication system 300 is or could be in data communication with other nodes through wireless communication links. Additionally, all nodes of communication system 300 are, or could be, in data communication with other communication devices dispersed throughout the world through PSTNs and/or conventional terrestrial communication devices coupled to a PSTN through conventional terrestrial facilities. Each node, including communication sources, such as CUs 340, desirably contains elements identical to or similar to those illustrated FIG. 4 below and discussed in more detail with respect to access controller 350. Communication sources, such as CUs 340, also desirably include one or more elements, such as a transceiver and/or a processor, for requesting a channel having a desired quality of service level, one or more elements, such as a transceiver and/or processor, for receiving an assignment to communicate on a channel corresponding to a desired level of quality of service, and one or more elements for communicating on said channel in accordance with assignment.

In the exemplary configuration shown in FIG. 3, one or more satellites 310 handle traffic to and from CUs 340 over wireless communication link 240. In a preferred embodiment, link 240 uses a limited portion of the electromagnetic spectrum that is divided into numerous channels as discussed above with reference to FIG. 2. Link 240 preferably uses a portion of L-Band, K-Band, or S-Band frequency channels or combinations thereof, and could encompass Frequency Division Multiplex Access (FDMA), Time Division Multiple Access (TDMA) communications and/or Code Division Multiple Access (CDMA) or a combination thereof. Other access methods could be used as known to those of ordinary skill in the art. System 300 also desirably includes access controller 350. FIG. 4 illustrates a block diagram of an access controller in accordance with a preferred embodiment of the present invention. In a preferred embodiment, access controller 350, includes one or more transceiver/s 400, processor/s 410, and memory device/s 420. Each of these are interconnected as shown in FIG. 4. Processor 410, among other things, executes algorithms in the form of software stored in memory device 420 for carrying out methods 600 and 700 described below with reference to FIGS. 6 and 7. Transceiver 400 includes receiver and transmitter elements for receiving and transmitting signals, preferably RF signals, to and from one or more other nodes of system 300, such as CUs 340.

Although access controller 350 is illustrated as an independent node of system 300, access controller need not be a specific, independent device. Software carrying out the access control methods of the present invention could reside in a single location, such as, for example, software located in a single processor in a single node of system 300 (such as access controller 350 or some other node), which includes software capable of implementing the multiplexing and channel assignment methods described below with reference to FIGS. 6–7. Alternatively, access controller 350 could serve to represent one or more processors disbursed throughout system 300 in one or more of satellites 310, CUs 340 and/or other nodes 320, such as a base station or network control facility. Thus, access controller 350 could be a "virtual" device rather than one or more physical, independent devices.

Referring now back to FIG. 3, FIG. 3 includes a schematic illustration of air interface statistical multiplexing using a TDMA/FDMA scheme 360. The TDMA/FDMA scheme 360 used in this exemplary illustration is not intended to be limiting of the scope of the present invention. As previously noted, numerous other access schemes could be employed without departing from the scope of the present invention.

In TDMA/FDMA scheme 360, carrier frequencies 362–366 indicate different frequencies over which information can be passed through wireless communication link 240. FIG. 3 illustrates only three carrier frequencies 362–366 for ease of illustration, but any number of carrier frequencies could be used depending on system capacity and other system constraints. Time slots 372–378 indicate time segments within a time frame during which separate groups of information can be transmitted. As used herein, a "channel" is comprised (in one embodiment) of a combination of a single carrier frequency 362–266 and a single time slot 372–378 that is used to transmit information otherwise referred to as a time-frequency (TF) pair. Thus, FIG. 3 illustrates 12 channels.

To realize the benefits of statistical multiplexing in the present invention, more communication sources 220 (or CUs 340) are granted access to utilize system 300, than there are individual channels to allocate. In a system where all communication sources are given the same quality of service (e.g., all users pay the same rate for the same guaranteed access), this could be done in a manner the would not penalize one user over another. Alternatively, assignments can be made in accordance with varying quality of service levels as described with reference to FIG. 5 below.

Statistical multiplexing for a wireless TDMA/FDMA system can be accomplished, in a preferred embodiment of the present invention, by changing how the TF pairs are assigned. Rather than assign a TF pair to a user (or communication source, such as CU 340) for the full duration of its connection, a TF pair, or channel (as that term is used herein), could be assigned for some time interval, such as, for example, a frame interval or several frame intervals. Each assignment is made from the total possible set of TF pairs.

When the number of CUs 340 is less than or equal to the total number of TF pairs (such as the 12 TF pairs illustrated in FIG. 3), each CU 340 could be assigned a unique TF pair. No CUs would have to share the same TF pair and no collisions will occur between data or information sent by CUs 340, as channel (TF pair) assignments would desirably be made to ensure that there would be no collisions. However, when the total number of CUs needing access to the system exceeds the total number of TF pairs, assignment of TF pairs are made on a random or pseudo-random basis through an assignment algorithm as discussed below. In an alternative embodiment, the process could be non-random.

For example, if fifteen CUs 340 want access to system 300, initial TF pair assignments could be made as follows. Let each CU be represented by the numbers 1–15. These numbers could be placed in a hypothetical "bucket" and a first number corresponding to a CU could be randomly selected. A first CU selected could be assigned channel 380 corresponding to ts1-f1 (where "ts1" is time slot 1 and "f1" is frequency 1. A next number corresponding to a second CU could then be selected from the "bucket" and assigned to another channel, such as channel 382 corresponding to ts2-f1. This process could continue until all twelve TF pairs (or channels) have been used.

In this example, three CUs would remain in the "bucket" after the channel assignments are made. For the remaining CUs, a next CU could be selected and randomly assigned to one of the 12 channels, or TF pairs. This process could be repeated for the two remaining CUs (randomly assigning TF pairs from the set of TF pairs that are not already "overbooked" or double assigned). These assignments could be relayed to the CUs though an access assignment channel, the standard feedback channel or other means. This assignment of TF pairs or channels would desirably remain in effect for a specified time interval, say, for example "M" frames. During a first time interval, the next set of TF pairs for a second time interval could be pre-calculated.

The next step of the assignment algorithm (e.g., assigning channels for a second time interval following the first time interval) can be carried out in several alternate ways. In one embodiment, the initial assignment process can simply be repeated for the second time interval.

In an alternate embodiment, system 300, preferably through software in access controller 350, keeps track of CUs that were forced to share a channel during the first interval and exempt them from sharing a channel during the second time interval. In the above example, six users would have been assigned to share a channel for the first time interval.

These six users could be assigned channels corresponding to TF pairs such as, for example, ts1-f1, ts2-f2, and ts3-f3. Of the nine remaining CUs, six would be selected randomly and assigned the next six TF pairs. The three remaining CUs not yet selected could be assigned TF pairs randomly from the set Ts3-f1 through ts4-f3. The process would continue to repeat every "M" frames, where M is some predetermined number of frames.

Other variations on the assignment algorithm also could be employed depending upon the number of channels relative to the total number of CUs desiring access to system 300. For example, in an ATM satellite-based network, a scheme could also be implemented where the available frequency-time space is divided into subsets each correlated with ATM QoS categories. For example ABR (available bit rate), CBR (continuous bit rate), UBR (unspecified bit rate), and VBR (variable bit rate) N-Rt connections could be assigned subsets that favor more "overbooking" than the others. The granularity of these subsets could be further defined based on the QoS parameters and other factors.

Thus, QoS constraints could be used to shape and optimize the overall capacity of the network, while preserving QoS guarantees. This is discussed further with reference to FIGS. 5–7.

Figure 5:
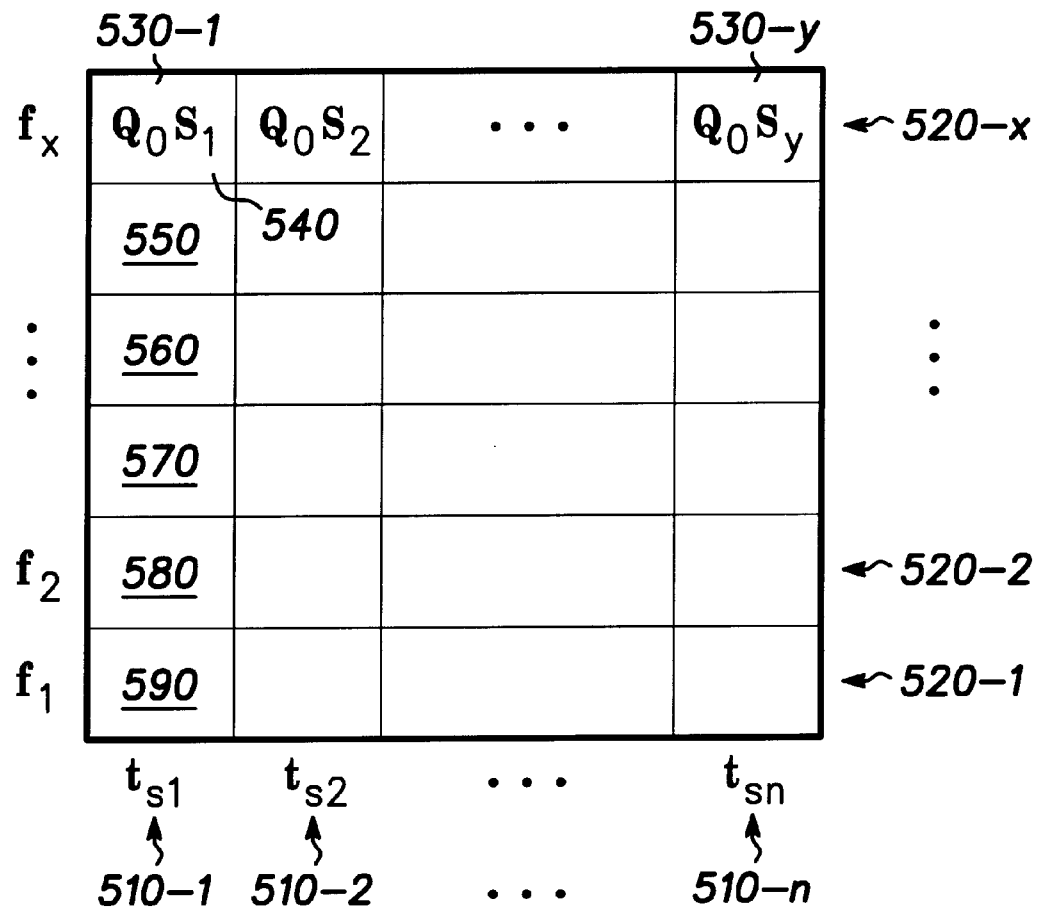
FIG. 5 illustrates a diagram of a TDMA/FDMA channel assignment grid showing an example of quality of service assignments in relation to channel assignments.

FIG. 5 illustrates a diagram of a TDMA/FDMA channel assignment scheme showing an example of QoS assignments in relation to channel assignments. TDMA/FDMA structure 500 is broken down into time slots 510-i, where i=1, . . . n, and frequency slots 520-i, where i=1, . . . x. The actual number of time slots and frequency slots provided is not material in the present invention, and any number of various time slot/frequency combinations could be used.

In a preferred embodiment of the present invention, each time slot 510-i/frequency 520-x combination can be assigned a QoS level 530-i, where i=1-y. Different QoS levels 530-i could be assigned to each individual time slot/frequency combination (e.g., each box in structure 500 could have a different QOS level designations, or QOS levels could be made in sets or groups). Thus, for example, in FIG. 5, all assignments to ts1 510-1, at any frequency, could be assigned to a first QoS set (corresponding to a first QoS level, 530-1) such that assignments 540–590 (representing channels assignments) all would be within the first QoS set and have the same QoS level designation. The QoS level designation could be based on the level of "overbooking" that will occur on channels of the first QoS set.

For example, channels within the first QoS set corresponding to QoS level 530-1 could be designated as a highest level of QoS where these channels are dedicated channels to system users wanting 100% guaranteed access to resources of system 300 during a particular time interval are assigned. System users wanting a high level of accessibility could be charged a higher rate. Such channels could be reserved for system users engaging in video conferencing or similar activities which require immediate delivery of information or could be other similar users wanting a high level of accessibility to system 300.

At another end of the QoS spectrum, QoS designations could reflect users simply wanting to transmit information packets containing some form of data that need not be delivered immediately, such as e-mail information. Thus, these users could be willing to tolerate a lower level of accessibility (and possible delay of delivery due to being overbooked on a channel during a first time interval) in exchange for a lower cost of delivery. These users could be assigned to overbooked channels in which the probability that they will encounter a collision with one or more other users/communication sources sharing the same channel for a time interval during which they wish to burst data is higher than if they were assigned to a dedicated channel in a higher QoS level, but where it is still not highly probable that they will encounter a collision due to the bursty nature of their transmissions. Thus, some or all of the channels of a lowest QoS set would be "overbooked" or have multiple users assigned to them during most time intervals.

Any number of variations of QoS levels could exists between the highest and lowest QoS levels described above. Moreover, QoS level designations could be changed over time in accordance with system demands and various other system issues.

Figure 6:
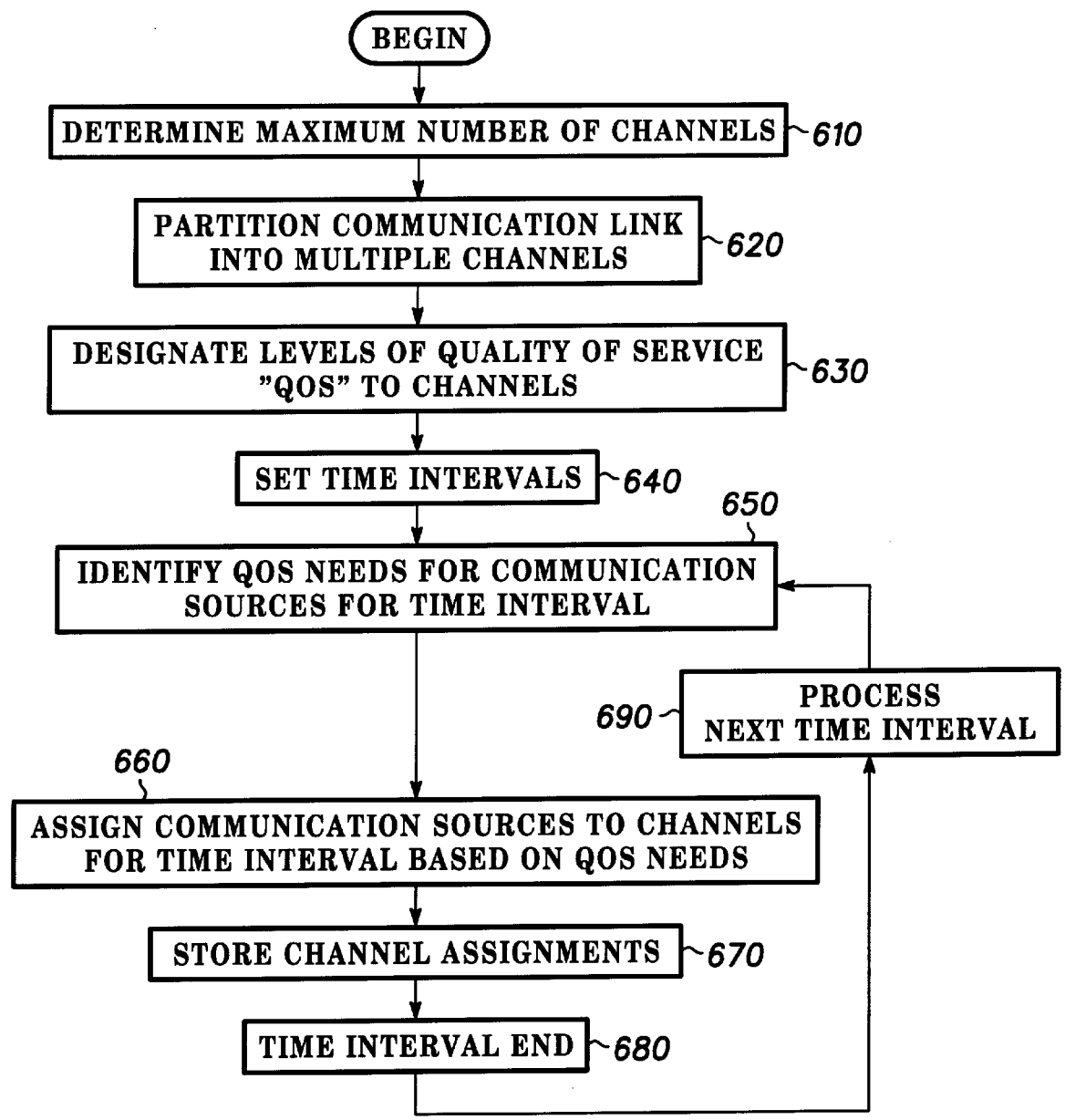
FIG. 6 illustrates a method for optimizing utilization of a wireless communication link in a communication network.

FIG. 6 illustrates a method for optimizing utilization of a wireless communication link in a communication network in accordance with a preferred embodiment of the present invention. Method 600 desirably is executed by software contained in one or more processors in one or more nodes of system 300. Method 600 could be carried out in whole or part by access controller 350 or by one or more other nodes of system 300, or by combinations of such nodes.

Method 600 begins in step 610 when the system determines the maximum number of channels to be provided for use by CUs 340 of system 300 when communicating over a particular wireless communication link 240. Method 600 can be executed for numerous wireless communication links 240 in system 300 from any number of nodes 320 of system 300. Wireless communication links 240 from different nodes 320 of system 300 could be partitioned differently (e.g., include a different number of channels) or could be partitioned the same. The number of channels provided could be based on any number of factors, including available spectrum, data rate, number of system users, and other factors and could change over any number of time intervals. The actual number of channels provided is not critical to the present invention.

In step 620, one or more wireless communication links 240 is partitioned into multiple channels in accordance with the maximum number of channels to be provided as determined in step 610. In step 630, channels are designated QoS levels. As discussed above with reference to FIG. 5, numerous variations of QoS assignments are contemplated by and within the scope of the present invention. For example, QoS assignments could be made on a channel-by-channel basis, with each channel having a unique QoS level designation, or channels could be arranged into QoS sets, where multiple channels have the same QoS designation in terms of guaranteed availability or conversely in terms of level of "overbooking" or sharing required within the set. Channels within particular QoS sets also could have varying levels of QoS designations. Moreover, QoS levels could be set the same for all channels in some systems or during certain time intervals such that all channels would have the same availability.

In step 640, the time interval for channel assignments and reassignments will be set. As noted above, channels assignments can be made for some time interval which is less than the duration of a connection between a CU and the system. Time intervals could be set in terms of frames or based on some other interval. A time interval could be as little as one frame or could be several frames, or could, in some instances, be the duration of a connection. Various levels of time intervals could be used for various types of connections. QoS designations can be changed at each time interval for any or all CUs or can remain the same for multiple time intervals for some or all CUs. A high degree of flexibility is contemplated in method 600.

In step 650, the system identifies the QoS needs for communication sources of the system for a particular time interval. This can be done on a non-real time basis or a real time basis. For example, the system can identify the estimated needs of system users during some planning interval which could be one or more hours, days or weeks based on subscription requests of system users or other sources of information, then the system can identify QoS needs of users from that information. Alternatively, users can submit QoS requests on a real-time basis for some shorter interval of time when system users request a connection or request permission to transmit information.

In step 660, the system will assign communication sources to channels for one or more time intervals. Channels assignments will reflect QoS needs and requests from system users to the extent possible during the particular time interval. It is contemplated that during some time intervals, the system may not be able to meet the QoS desires of all system users and may need to offer one or more system users an alternative level of QoS for a particular time interval. The channel assignment process is discussed further with reference to FIG. 7.

In step 670, the channel assignments for the present time interval are stored in one or more memory devices in system 300. The system will then monitor the duration of the time interval and determine, in step 680, whether the time interval has ended. If the time interval has not ended, the assignments made in step 660 will be maintained. When the system determines that a particular time interval has ended, the system will then, in step 690, process assignments for the next time interval and return to step 650 in a loop in which the system then identifies the QoS needs for communication sources for the next time interval and makes channel assignments accordingly.

Figure 7:
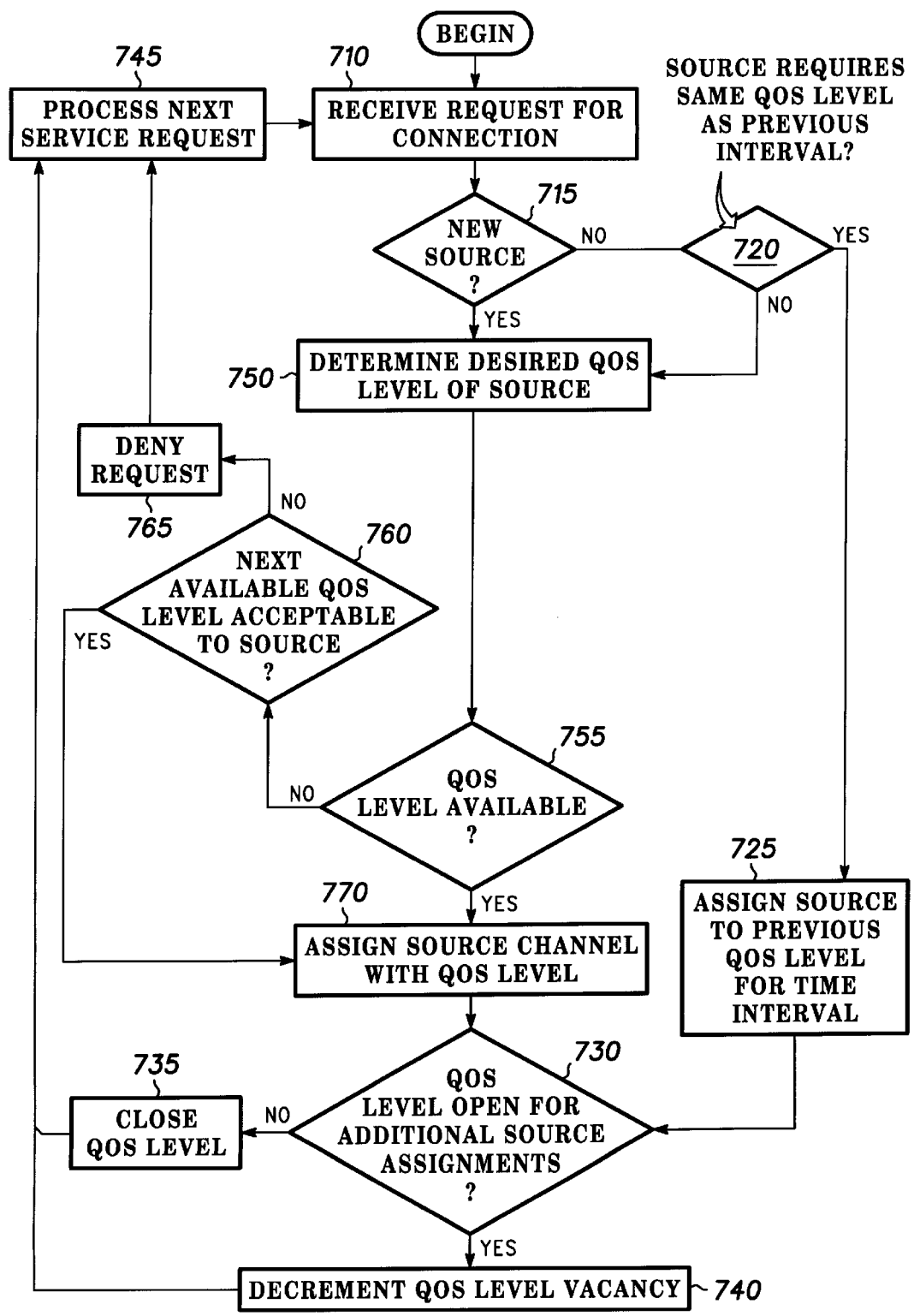
FIG. 7 illustrates a method for making channel assignments in accordance with a preferred embodiment of the present invention.

FIG. 7 illustrates a method for making channel assignments in accordance with a preferred embodiment of the present invention. FIG. 7 presents a more detailed explanation of a preferred embodiment of the channel assignment process of step 660 of method 600. Other, similar channel assignment methods could be employed without departing from the scope of the present invention. Assignment method 700 desirably is carried out, at least in part, in a programmable processor, such as processor 410 of access controller 350 (FIGS. 3 and 4). Alternatively, method 700 could be carried out in whole or part by one or more programmable processors included in one or more other nodes of system 300. The steps of method 700 could be carried out in one or more satellites or other or in one or more nodes located on the ground.

Method 700 begins in step 710 when the system receives a request for a connection during a particular time interval. In step 715, the system determines whether the communication source requesting a connection is a new source (e.g., that was not active or included in the assignments of the previous time interval) or a source that was included in the previous time interval assignments.

If the communication source is not a new source, the system will determine, in step 720, whether the source is requesting the same level of QoS as it desired in the previous time interval. If the same level of QoS is requested as in the previous time interval, the system will assign the source to a channel having the same QoS level designation as the channel to which the source was assigned in the previous time interval (which may or may not be the same actual channel, in terms of time slot/frequency assignment or other similar assignment and could be a different channel assignment within the same QoS set). The system will then, in step 730, as to whether the particular QoS level (be it an individual channel or a QoS set) is available for additional source assignments based on the level of "overbooking" allowed in the particular QoS set or channel. If the QoS parameters of the channel or QoS set do not allow for additional assignments, the QoS level will be closed in step 735 and the next source will be processed in step 745. If, on the other hand, the QoS level to which the source is assigned still has availability, the system will, in step 740 decrement QoS level vacancy for the remainder of the time interval and then process the next source in step 745.

If the system determines in step 720, that the source is requesting a new level of QoS, the system will, in step 750, determine the new desired level of QoS of the source for the time interval. The system will then, in step 755, inquire as to whether the desired QoS level is available for that time interval. If the QoS level is available, the system will, in step 770, assign the source to a channel supporting the desired QoS level and determine, in step 730, whether the QoS level is available for additional source assignments as discussed above. If the QoS parameters of the channel or QoS set do not allow for additional assignments, the QoS level will be closed in step 735 and the next source will be processed in step 745. If, on the other hand, the QoS level to which the source is assigned still has availability, the system will, in step 740 decrement QoS level vacancy for the remainder of the time interval and then process the next source in step 745.

If the system determines, in step 755, that the desired QoS level is not available for that time interval, the system will, in step 760 determine whether the next available QoS level (either higher or lower) is acceptable to the source. This could be determined by reviewing a predetermined QoS assignment prioritization provided by the communication source when it requests a connection or it could be determined by a real time query to the particular communication source.

If the system determines, in step 760 that the source is willing to accept the next available QoS level, the system will, in step 770, assign the source to a channel within the next available QoS level, which desirably is the highest available QoS level remaining during the time increment. The system will then execute steps 730–745 as previously described above.

If the system determines, in step 760, that the source is not willing to accept the next available QoS level, the system can, in step 765, deny the connection request. The system would then process the next source request in step 745.

If in step 715, the system determines that the communication source is a new source that was not assigned a channel in the previous time interval, the system will determine whether all existing sources (e.g., sources that were assigned a channel in the previous interval) have been assigned a channel for the current interval. Assuming that all existing sources have been assigned a channel for the current interval, the system will, in step 750, determine the desired QoS level for the new source for the time interval.

The system will then, in step 755, inquire as to whether the desired QoS level is available for that time interval. If the QoS level is available, the system will, in step 770, assign the source to a channel supporting the desired QoS level and determine, in step 730, whether the QoS level is available for additional source assignments as discussed above. If the QoS parameters of the channel or QoS set do not allow for additional assignments, the QoS level will be closed in step 735 and the next source will be processed in step 745. If, on the other hand, the QoS level to which the source is assigned still has availability, the system will, in step 740 decrement QoS level vacancy for the remainder of the time interval and then process the next source in step 745.

If the system determines, in step 755, that the desired QoS level is not available for that time interval, the system will, in step 760 determine whether the next available QoS level (either higher or lower) is acceptable to the source. This could be determined by reviewing a predetermined QoS assignment prioritization provided by the communication source when it requests a connection or it could be determined by a real time query to the particular communication source.

If the system determines, in step 760 that the source is willing to accept the next available QoS level, the system will, in step 770, assign the source to a channel within the next available QoS level, which desirably is the highest available QoS level remaining during the time increment. The system will then execute steps 730–745 as previously described above.

Method 700 is contemplated to be iterative in nature and will continuously process CU requests.

In summary, the present invention provides, among other things a method, apparatus, and communication system for optimizing utilization of a wireless communication link in a limited bandwidth communication system or network. Statistical multiplexing is achieved by partitioning a wireless communication link into multiple communication channels and assigning communication sources to communicate information over an air interface for a predetermined time interval, where the number of communication sources assigned to the communication channels (250) during a particular time interval exceeds the number of available communication channels. The method, apparatus, and communication system of the present invention also allow a system operator to provide varying levels of quality of service (QoS) guarantees by designating varying levels of QoS among the communication channels.

While the present invention has been described above in connection with a specific method and apparatus and with reference to a preferred embodiment, it is to be clearly understood that this description is made only by way of example and not as a limitation on the scope of the invention. For example, although the method and apparatus of the present invention are described, in a preferred embodiment, with reference to a TDMA/FDMA satellite communication system, the method and apparatus of the present invention also could be implemented both in other wireless communication systems, terrestrial cellular systems and/or in wire-based systems employing multiple access techniques such as TDMA, FDMA, CDMA, and/or combinations thereof, to name a few. Those skilled in the art will recognize that changes and modification could be made in the preferred embodiment without departing from the scope of the present invention.

What is claimed is:

1. A method for optimizing utilization of bandwidth in a communication network having multiple communication sources, multiple nodes and at least one wireless communication link, the method comprising:

partitioning said at least one wireless communication link into X communication channels; and assigning N communication sources of said multiple communication sources to communicate information over an air interface through said X communication channels for a first predetermined time interval, wherein X has a numeric value which is less than a numeric value of N and assigning N communication sources of said multiple communication sources to communicate information over an air interface through said X communication channels for said first predetermined time interval comprises:

receiving a request for a channel assignment from a communication source, said request including a requisition for a connection corresponding to a desired level of quality of service during a first time interval;

determining for a second predetermined time interval whether said desired level of quality of service is available for assignment during said first time interval;

if said desired level of quality of service is available for assignment during said first time interval, assigning said communication source a communication channel corresponding to said desired quality of service during said first time interval;

if said desired level of quality of service is not available for assignment during said first time interval, determining if said communication source is willing to accept said channel assignment to communicate using one of said X communication channels corresponding to a next available level of quality of service during said first time interval; and if said communication source is willing to accept an assignment to communicate using said one of said X communication channels corresponding to said next available level of quality of service during said first time interval, assigning said communication source to said one of said X communication channels corresponding to said next available level of quality of service during said first time interval.

2. In a communication system having a wireless communication link with a link capacity, a method for statistical multiplexing comprising:

partitioning said wireless communication link into multiple channels;

designating multiple levels of quality of service to said multiple channels; and assigning a number of communication sources to communicate over said wireless communication link using an air interface with said multiple channels, wherein a capacity needed to support simultaneous communications of said number of communication sources exceeds said link capacity and assigning said number of communication sources to communicate over said wireless communication link using said air interface with said multiple channels comprises:

identifying a group of communication sources for communicating over said wireless communication link, said group of communication sources formed of a total number of communication sources;

selecting a first subset of said group of communication resources, wherein said first subset comprises a second number of communication sources which is less than said total number of communication sources;

assigning said first subset of said group of communication sources to communicate over a first set of channels;

selecting a second subset of said group of communication sources, wherein said second subset comprises at least one communication source which is absent from said first subset; and assigning at least one communication source of said second subset to share a communication channel of said multiple channels with at least one communication source of said first subset during a first time interval.

3. The method as claimed in claim 2, further comprising:

reassigning at least one communication source which was assigned to share said communication channel during said first time interval to communicate using a second communication channel that is not shared with another communication source during a second time interval.

4. The method as claimed in claim 2, wherein selecting a first subset of said group of communication sources comprises randomly selecting communication sources from said group of communication sources to be included in said first subset.

5. The method as claimed in claim 2, wherein selecting said first subset of said group of communication sources comprises selecting communication sources of said group of communication sources to be included in said first subset based on requests by said communication sources to communicate using said communication channel corresponding to one of said multiple levels of quality of service.

6. In a communication system having a wireless communication link having a link capacity, a method for statistical multiplexing comprising:

partitioning said wireless communication link into multiple channels;

designating multiple levels of quality of service to said multiple channels; and assigning a number of communication sources to communicate over said wireless communication link with an air interface using said multiple channels, wherein a capacity needed to support simultaneous communications of said number of communication sources exceeds said link capacity and assigning a number of communication sources to communicate over said wireless communication link with said air interface using said multiple channels comprises:

identifying a group of communication sources for communicating over said wireless communication link;

selecting a first subset of said group of communication sources, wherein said first subset is less than said number of communication sources;

assigning said communication sources of said first subset to communicate over a first set of channels, said first set of channels having at least one designated quality of service level, said at least one designated quality of service level being based on a potential overbooking degree of at least one of said multiple channels for said designated quality of service level;

selecting a second subset of said group of communication sources, wherein said second subset comprises at least one communication source which was not included in said first subset; and assigning at least one communication source of said second subset to communicate over said at least one of said multiple channels, said channel having a second designated quality of service level which is different from said designated quality of service level of said first set of channels.

7. The method as claimed in claim 6, wherein in assigning said communication sources of said first subset to communicate over said first set of channels, said first subset of channels includes at least one dedicated channel to which no more than one communication source is assigned, and wherein in assigning at least one communication source of said second subset to communicate over said channel, said channel has a second designated quality of service level which is different from said designated quality of service level of said first set of channels including a second channel which has a relatively high probability of being assigned to more than one communication source of said group of communication sources.

8. A communication system including a network of nodes being linked by multiple wireless communication links, a first wireless communication link of said multiple wireless communication links extending between a first and second node of said network and having a link capacity, the communication system comprising:

multiple communication sources;

a processor adapted to partition said first wireless communication link into multiple channels, designate multiple levels of quality of service to said multiple channels, designate multiple levels of quality of service to said multiple channels, and assign said multiple communication sources to communicate using said multiple channels, wherein a capacity needed to support simultaneous communications of said multiple communication sources over said first wireless communication link exceeds said link capacity and said communication system uses a combination of time division multiplexing TDMA and frequency division multiplexing FDMA to allow multiple access to said communication system over said first wireless communication link, and wherein each channel of said multiple channels comprise a time-frequency TF slot corresponding to a time slot and a frequency slot; and means for assigning at least one TF slot to support communication from more than one communication source over a first time interval.

9. A communication system including a network of nodes linked by multiple wireless communication links, a first wireless communication link of said multiple wireless communication links extending between a first node and a second node of said network and having a link capacity, the communication system comprising:

multiple communication sources;

a processor adapted to partition said first wireless communication link into multiple channels, designate multiple levels of quality of service to said multiple channels, designate multiple levels of quality of service to said multiple channels, and assign said multiple communication sources to communicate using said multiple channels, wherein a capacity needed to support simultaneous communications of said multiple communication sources over said first wireless communication link exceeds said link capacity;

means for identifying a group of communication sources for communicating over said multiple wireless communication links, said group being comprised of a total number of communication sources;

means for selecting a first subset of said group of communication sources, wherein said first subset comprises a number of communication sources which is less than said total number of communication sources;

means for assigning said communication sources of said first subset to communicate over a first set of channels;

means for selecting a second subset of said group of communication sources, wherein said second subset comprises at least one communication source which was not included in said first subset; and means for assigning at least one communication source of said second subset to share a channel assignment with at least one communication source of said first subset for a first time interval.

10. The communication system as claimed in claim 9, further comprising:

means for reassigning at least one communication source which was assigned to share a communication channel in said first time interval to communicate using a second communication channel that is not shared with another communication source during a second time interval.

11. The communication system as claimed in claim 9, further comprising:

means for randomly selecting communication sources from said group of communication sources to be included in said first subset.

12. The communication system as claimed in claim 9, further comprising:

means for selecting communication sources of said group of communication sources to be included in said first subset based on requests by said communication sources to communicate using a communication channel corresponding to a designated quality of service level.

13. A communication system including a network of nodes being linked by multiple wireless communication links, a first wireless communication link of said multiple wireless communication links extending between a first and second node of said network and having a link capacity, the communication system comprising:

multiple communication sources;

a processor adapted to partition said first wireless communication link into multiple channels, designate multiple levels of quality of service to said multiple channels, designate multiple levels of quality of service to said multiple channels, and assign said multiple communication sources to communicate using said multiple channels, wherein a capacity needed to support simultaneous communications of said multiple communication sources over said first wireless communication link exceeds said link capacity;

means for identifying a group of communication sources for communicating over said first wireless communication link, said group being comprised of a total number of communication sources;

means for selecting a first subset of said group of communication sources, wherein said first subset comprises a number of communication sources which is less than said total number of communication sources; means for assigning said communication sources of said first subset to communicate over a first set of channels, said first set of channels having at least one designated quality of service level, said designated quality of service level being corresponding to a potential degree of required sharing of each channel in said quality of service level;

means for selecting a second subset of said group of communication sources, wherein said second subset comprises at least one communication source which was not included in said first subset; and means for assigning at least one communication source of said second subset to communicate over a channel, said channel having a second designated quality of service level which is different from said designated quality of service level of said first set of channels.

14. The communication system as claimed in claim 8, wherein said processor is adapted to assign said multiple communication sources to use said multiple channels for a first time interval base, at least in part, on requests from said multiple communication sources for an assignment of a channel corresponding to a desired level of quality of service.

* * * * *